United States Patent [19]

Srajer

[11] Patent Number: 4,554,768

[45] Date of Patent: Nov. 26, 1985

[54] DOCK SEAL WITH ADJUSTABLE TOP SEAL

[75] Inventor: Reinhard Srajer, Colorado Springs, Colo.

[73] Assignee: Woodford Manufacturing Company, Colorado Springs, Colo.

[21] Appl. No.: 487,063

[22] Filed: Apr. 21, 1983

[51] Int. Cl.[4] ........................................... E04H 14/00
[52] U.S. Cl. ................................ 52/173 DS; 52/396; 160/243
[58] Field of Search .................. 52/173 DS, 396, 250, 52/282; 406/112; 160/41, 243

[56] References Cited

U.S. PATENT DOCUMENTS

| | | | |
|---|---|---|---|
| 626,475 | 6/1899 | Andrews | 160/243 |
| 3,322,132 | 5/1967 | Rieder et al. | 52/173 DS X |
| 3,375,625 | 4/1968 | Edkins et al. | 52/173 DS |
| 3,613,324 | 10/1971 | Conger | 52/173 DS |
| 4,062,157 | 12/1977 | Potthoff | 52/173 DS |

FOREIGN PATENT DOCUMENTS

1267642  5/1968  Fed. Rep. of Germany ...... 160/243
9779  of 1913  United Kingdom ................ 160/243

*Primary Examiner*—Carl D. Friedman
*Assistant Examiner*—Naoko N. Slack
*Attorney, Agent, or Firm*—Zarley, McKee, Thomte, Voorhees & Sease

[57] ABSTRACT

A loading dock seal with an adjustable top seal for providing a weather-tight seal between a loading access opening of a loading dock and vehicles of various heights which includes a compressible pad means surrounding at least the vertical sides of the opening and made of a durable yet resilient material to provide a weather-tight seal on opposite vertical sides between the pad and the vehicle being unloaded. A curtain means, attached at its upper edge above the loading access opening and at its lower edge to a tubular top seal, is of sufficient width to cover the opening. The top seal is vertically adjustable from a storage position above the opening to a sealing position upon the roof of the vehicle thereby combining with the curtain to provide a weather-tight seal between the building and the vehicle.

15 Claims, 6 Drawing Figures

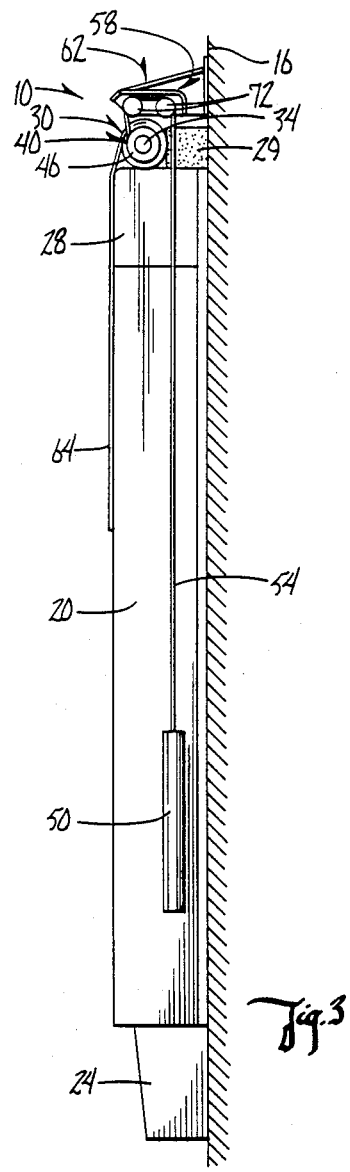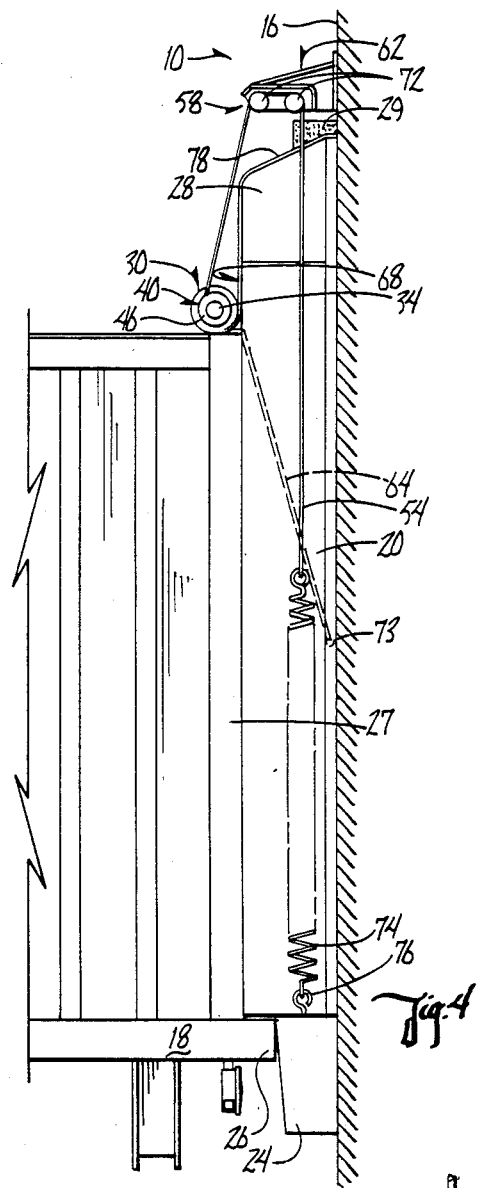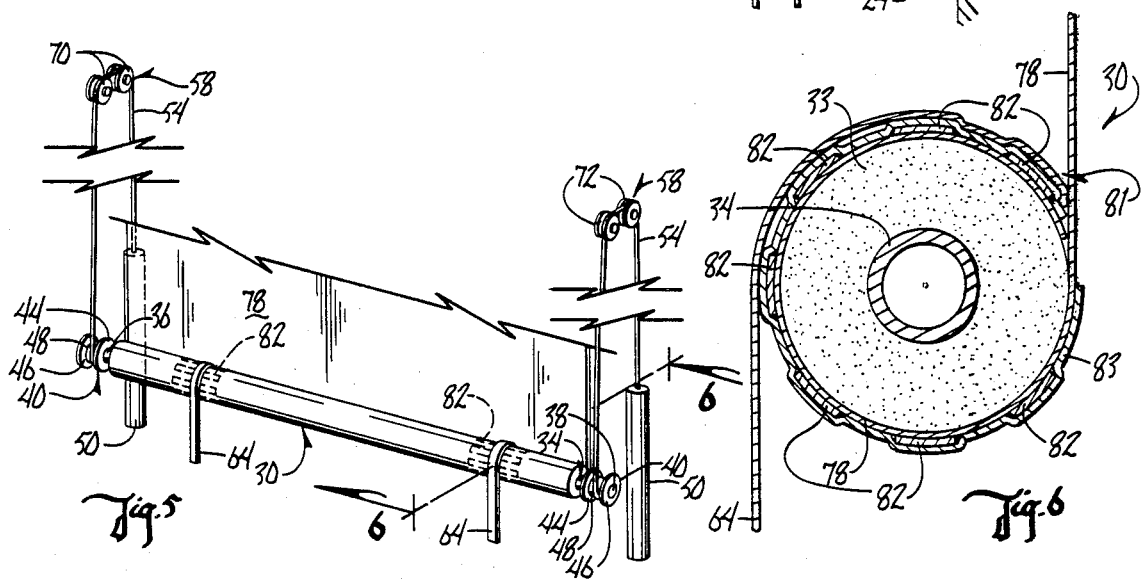

DOCK SEAL WITH ADJUSTABLE TOP SEAL

BACKGROUND OF THE INVENTION

This invention relates to loading dock seals, and in particular, loading dock seals with adjustable top seals for vehicles of different heights.

Loading docks generally consist of an opening placed in a building in such a position that vehicles can back up to the opening and load or unload items directly through the opening without having to use inclined planes or other means. The bed of the vehicle and the floor of the opening are generally approximately level but the roof of different vehicles varies from vehicle to vehicle.

Loading dock seals were developed to seal any gaps between the vehicle and the building to keep out weather and wind. There are generally two types of loading dock seals, the first being a stationary dock seal, which usually utilizes resilient pads around the perimeter of the opening so that the vehicle simply backs against the pads to shut out weather and wind. A particular problem with stationary loading dock seals is that they are not adjustable to varying heights of different vehicles. The second type of loading dock seals have adjustable top seals which can be vertically adjusted to match the vertical height of different sized vehicles. In most cases, the adjustable top seals simply are vertically adjustable to try to match the roof height of the vehicle. Problems with presently used dock seals with adjustable top seals are that they must be adjusted before the vehicle backs to the loading dock. Estimations or measurements must be made before backing and if incorrect, requires a repeating of the procedure. Additionally, these adjustable top seals are, like the pad members, along the sides of the opening, contacted and compressed by the vehicle to complete the seal. This makes the adjustable top seal, and particularly the mechanisms used to adjust the top seal, subject and susceptible to damage by the compression. Many times these adjustable top seals therefore bind or are difficult to adjust, requiring time and extra personnel to operate them.

It is therefore an object of this invention to provide a loading dock seal with an adjustable top seal which solves the aforementioned problems in the art.

A further object of this invention is to provide an adjustable loading dock seal with an adjustable top seal which provides a weather-tight seal between the loading dock and the vehicle.

A further object of this invention is to provide a loading dock seal with an adjustable top seal which does not require adjustment before backing the vehicle against the dock.

Another object of this invention is to provide a loading dock seal with an adjustable top seal which is easy to operate and maintain and which can be operated by one person.

Another object of this invention is to provide a loading dock seal with an adjustable top seal which is less susceptible to damage.

A further object of this invention is to provide a loading dock seal with an adjustable top seal which is durable, economical, and easy to use.

These and other objects, features, and advantages of the invention will become apparent with reference to the accompanying specification and drawings.

SUMMARY OF THE INVENTION

This invention utilizes a dock seal with an adjustable top seal which is adjustable for different heights of different vehicles. Resilient compressible sealing pad means are positioned at least around the vertical sides of a loading access opening and the vehicle to be loaded or unloaded is backed into an abutting relationship with the pad means. The adjustable top seal comprises an elongated foam covered tubular member having cable drums at each end. The tubular member extends at least across the width of the loading access opening and is adjustable over a range from a storage position above the access opening to a sealing position wherein the top seal abuttingly rests upon the roof of the vehicle. A curtain means is attached at its upper edge to a securing means located above the access opening and at its lower edge to the top seal. By moving the top seal from the storage position to the sealing position, the curtain means is extended over any opening or gap between the top of the vehicle and the building while at the same time the vertical sides of the vehicle are sealed against the weather by abutting against the vertical pad means.

Means are provided for the operator of the invention to adjust the top seal from the storage position to the sealing position after the vehicle has been backed against the pad means and to reciprocally lift the tubular sealing member back to storage position.

BRIEF DESCRIPTION OF THE DRAWINGS

FIG. 3 is a side elevational view of the invention with the adjustable top seal in a storage position above the loading access opening.

FIG. 4 is a side elevational view of an alternative embodiment of the invention, with the adjustable top seal moved to a sealing position abutting the top of a vehicle.

FIG. 5 is a partial perspective view of the invention.

FIG. 6 is a sectional view taken along line 6—6 of FIG. 5.

DETAILED DESCRIPTION OF THE PREFERRED EMBODIMENT

Figure 1:
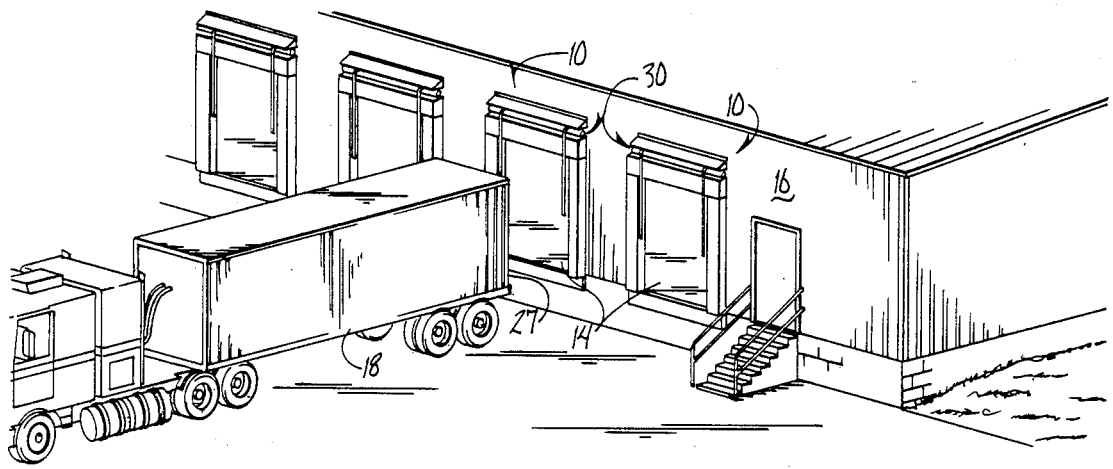
FIG. 1 is a perspective view showing a plurality of the inventions operatively mounted on a building with a like number of loading dock seals surrounding loading access openings.

In reference to the drawing, and particularly FIG. 1, there is shown a plurality of loading dock seals 10, each having an adjustable top seal 30 in accordance with the invention. Loading dock seals 10 surround loading access openings 14 in building 16 to provide a weather-tight seal for loading or unloading items once vehicles 18 are backed against loading dock seals 10.

Figure 2:
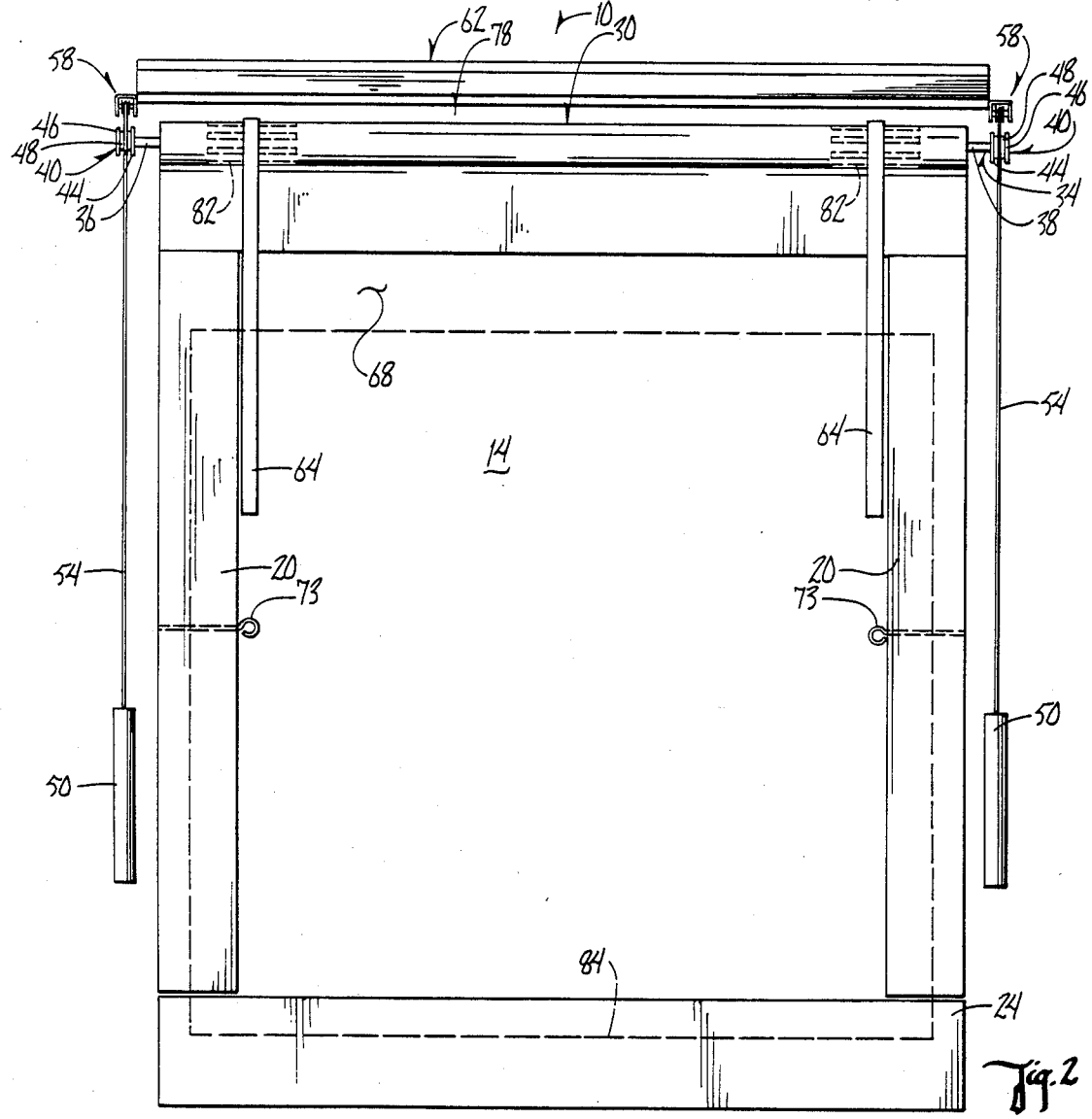
FIG. 2 is a front elevational view of the invention.

In FIG. 2 it can be seen that loading dock seal 10 has two vertical compressible pad members 20 which are made of a resilient material with a durable resilient covering and are positioned along opposite vertical sides of loading access opening 14. The bottom of loading access opening 14 is generally at the same vertical level as that of the floor of the building 16 and the floor of vehicle 18. A ledge 24 may be secured to building 16 below loading access opening 14. Ledge 24, in the preferred embodiment, is recessed closer to the building than vertical pad members 20 to allow room for bumper 26 of vehicle 18 to pass while at the same time allowing end 27 of vehicle 18 to contact and compress vertical pad members 20 (see FIG. 4). Ledge 24 can have one or more resilient cushioning bumpers along its length (not shown) to provide a backstop and yet prevent damage to ledge 24 or bumper 26 of vehicle 18.

In the preferred embodiment, a horizontal top pad member 28 is secured to building 16 and extends across vertical pad members 20 above loading access opening 14. Pad members 20 and 28 combine with ledge 24 to frame loading access opening 14. It is to be understood, however, that the invention is operable without top pad member 28. Top pad member 28 can have a flat top surface (as shown in FIG. 3) or can have a downwardly slanting surface (as shown in FIG. 4). A foam bumper 29 having a durable resilient covering can also be secured to building 16 or otherwise to serve as a backstop for top seal 30 when it automatically returns to the storage position.

Adjustable top seal 30 has an elongated tubular body with a central rigid tubular core 34 and an intermediate foam layer 33. Cable drums 40, each having an inner flange 44 and an outer flange 46 on opposite sides of a drum member 48, are securely mounted to ends 36 and 38 of tubular core 34.

In the preferred embodiment, adjustable top seal 30 rests on top of top pad member 28 in what shall be called its first position or storage position and is held in place there by the biasing action of counter weights 50 which are attached by cables 54 to cable drums 40 respectively. Cables 54 extend upwardly and over pulley assemblies 58 and then downward to counter weights 50. Pulley assemblies 58 are secured above cable drums 40 to protective hood 62 which is in turn securely mounted to building 16. Pulley assemblies 58 alternatively could be mounted directly to building 16.

Straps 64 are attached at one end to adjustable top seal 30 and at their other end extend down into the loading access opening 14. The dashed line (referred to by reference numeral 84) in FIG. 2 in the shape of a rectangle represents the position of a vehicle 18 with a vertical height lower than top pad member 28 backed against loading dock seal 10. It can be seen that a gap 68 exists between the top of vehicle 18 and the top of loading access opening 14.

FIG. 3 shows in better detail, the working components of one embodiment of the invention. Pulley assemblies 58 are comprised of tandem sheaves 70 and 72 which are rotatably mounted at the ends of protective hood 62. Cables 54 are threaded over the tops of sheaves 70 and 72 so that at one end each cable 54 is attached to counter weight 50 and at the other to cable drum 40. Thus, cables 54 can be pulled over pulleys 70 and 72 along their lengths. By grasping straps 64, adjustable top seal 30 can be pulled down from its storage position along the face of pad members 28 and 20. The pulling of straps 64 (which are wound up on adjustable top seal 30) causes the rotation of foam layer 33, which in turn causes tubular core 34 and cable drums 40 to rotate in kind. Cables 54, therefore, are wound around cable drums 40. At the same time cables 54 are pulled across tandem sheaves 70 and 72 and counter weights 50 are raised along the sides of vertical pad members 20. Once top seal 30 is brought down abuttingly against the top of vehicle 18 (as seen in FIG. 4) straps 64 can be secured to a securing means such as hooks or handles 73 along the inside of loading access opening 14 so that top seal 30 can be held at that position in a sealing arrangement with the top of vehicle 18 against the biasing counterforce of counter weights 50. It is to be understood that tandem sheaves 70 and 72 could be replaced with a single sheave or with some other arrangement which produces the same operable results. For example, a guide means having simply an anchored guide arrangement might be used.

An alternative embodiment of the invention is shown in FIG. 4. Instead of counter weights 50 at one end of each cable 54, spring means 74 can be attached at a lower end to hooks 76 which are attached to ledge 24 or building 16 and at its upper end to cable 54. Spring means 74 would be in a compressed or relaxed state when adjustable top seal 30 is at its upper storage position (as shown in FIG. 3) but would be stretched or tensioned when adjustable top seal 30 was lowered to the sealing position on top of vehicle 18 (as seen in FIG. 4). Thus, pulling straps 64, which causes adjustable top seal 30 to roll along the face of pad members 28 and 20 down onto the roof of vehicle 18. in turn causes spring means 74 to present an increasing counter-biasing force. To keep adjustable top seal 30 in an abutting relation with the top of vehicle 18, straps 64 and 66 again would have to be secured to hooks or handles 73 as in the embodiment described with respect to FIG. 3.

When adjustable top seal 30 is in the lower sealing position with respect to either of the embodiments shown in FIG. 3 or 4, upon release of straps 64, the biasing force of either counter weights 50 or spring means 74 would cause cables 54 to be pulled back across tandem sheaves 70 and 72 and cause top seal 30 to be automatically raised back to the storage position above loading access opening 14. The automatic raising of adjustable top seal 30 is accomplished by the counterforce of the biasing means (either counterweights 50 or spring means 74 in the preferred embodiments). Cable drums 40 would be rotated and cables 54 unwound from cable drums 40 so that top seal 30 would be rolled along the face of pad members 20 and top pad member 28 back up into the storage position.

By referring to FIGS. 5 and 6, the operation of adjustable top seal 30 and its structure, including curtain means 78 is shown. Curtain means 78 is a flexible, rollable sheet being of sufficient width to cover the width of loading access opening 14 and is attached at its lower horizontal edge to top seal 30. Curtain means 78 is securely attached at its upper horizontal edge to building 16, protective hood 62 or top pad member 28 and is held stationary, sealingly and rigidly along that upper edge in that position. In use, curtain means 78 is rolled up on top seal 30 so that in the storage position above loading access opening 14. as shown in FIG. 3, curtain 78 is attached at its top edge to building 16 and extends down along the top of top pad member 28 to top seal 30 where curtain means 78 is rolled in a number of layers upon top seal 30. As can be seen in FIGS. 5 and 6, straps 64 are thus inter-rolled with curtain means 78. When looking at top seal from the perspective of FIG. 6, it can be seen that curtain means 78 will be rolled and unrolled from the right side of seal 30 and straps 64 will be rolled and unrolled from the left side of top seal 30. Referring specifically to FIG. 6 it can be seen that both curtain means 78 and straps 64 attach to the outer surface of top seal 30 at approximately the same point (designated by reference numeral 81) along top seal 30.

Curtain means 78 has slats 82 secured in two rows beginning at its bottom edge and extending a distance approximately equal to one circumference of top seal 30 and matching with the position of straps 64. Slats 82 help prevent undue or damaging compression of intermediate foam layer 33 by the pulling of straps 64. Slats 82 can be sewn or otherwise held to curtain means 78 by fabric 83 or by other means.

In operation, the invention functions as follows. In a first embodiment (shown in FIGS. 2, 3 and 5), a vehicle 18 is backed into position against the invention 10, so that vehicle 18's loading and unloading opening is in a position roughly equivalent to that shown by the dotted line 84 in FIG. 2. The vertical sides of vehicle 18 are sealed from outside weather by their compressive abutment to vertical pad members 20, and bumper 26 and ledge 24 provide shelter from weather for the bottom of vehicle 18. Any gap between ledge 24 and the floor of vehicle 18 can be covered by a rigid plate or the like (not shown).

A person can then enter the area around loading access opening 14 and pull straps 64 in a downward direction which will cause adjustable top seal 30 to begin to roll first down along top pad member 28 and then vertical pad members 20 from its storage position. Pulling on straps 64 causes top seal 30 to rotate which unwinds straps 64 and unrolls curtain means 78 along the face of pad members 28 and 20 while at the same time winds cables 54 around cable drums 40. Straps 64 are pulled downward until top seal 30 comes into sealing abutment with the top of vehicle 18 (the sealing position) and then straps 64 are secured to some type of hook or securing means 73. Therefore (as can be seen in FIG. 4) curtain means 78 covers gap 68 between the top of vehicle 18 and the top of loading access opening 14. Thus, all four sides of loading access opening 14 are sealed from the weather, this all being accomplished with only the driver of vehicle 18 backing against dock seal 10 and then pulling adjustable top seal 30 down against the top of vehicle 18 without having to measure or estimate positioning of top seal 30 before backing and without needing more than one person to complete the whole process.

Upon completion of loading or unloading, straps 64 are simply released from securing hooks 73 and the weight of counter weights 50 will automatically cause top seal 30 to be pulled upward from the sealing position. While being pulled upward, cable drums 40 will rotate by virtue of the unwinding of cables 54 in response to the pulling action of counter weights 50 which will automatically re-wind curtain means 78 around top seal 30 and at the same time re-wind straps 64 around top seal 30. Top seal 30 will continue to roll upward until it stops at the upper storage position. Top seal 30 will then be ready to be operated for the next vehicle, whether it be of different height from the vehicle which was just loaded or unloaded.

The structure of FIG. 4 would operate essentially the same, the only difference in this embodiment being that spring means 74 would provide the biasing force as opposed to counterweights 50.

It is to be understood that changes and modifications in the above described preferred embodiments can be made while staying within the scope of the invention. For example, adjustable top seal 30 could be lowerable onto truck 18 automatically by gravity instead of being pulled down by straps 64. Then, in the reverse of the previously described embodiments, top seal 30 could be returned to its first storage position by being manually pulled up and tied securely into position with or without assistance of counterweights. In this embodiment, cables 54 could extend through top pad member 28 into access opening 14 along vertical pad members 20 and be operated by one person to pull top seal 30 back to the storage position. Counterweights could be attached to the ends of cables 54 to bias the automatic lowering by gravity of top seal 30.

What is claimed is:

1. A loading dock adjustable top seal for providing a weather-tight seal between the top of a vehicle and the top of a loading access opening of a loading dock associated with a building when said vehicle is in an abutting relationship against said building comprising:
a vertically adjustable horizontal top sealing member having an elongated body extending across the width of said loading access opening;
a curtain means having an upper and a lower edge, said upper edge being attached to an attachment means mounted across and above said loading access opening, said lower edge being attached along said elongated body;
cable drum means mounted to said elongated body;
sheave means mounted above said access opening;
cable means having a first end connected to said cable drum means, said cable means extending over said sheave means and thence downwardly and terminating in a second end;
said cable means being wrapped around said drum means in a first direction and said curtain means being wrapped around said elongated body in a second direction opposite from said first direction;
said sealing member being movable downwardly from a storage position above said access opening to a sealing position spaced below said top of said access opening in response to upward movement of said second end of said cable means, whereby said sealing member will rotate in a first rotational direction during said movement so as to cause unrolling of said curtain member from said elongated body while at the same time causing said cable means to wind up around said drum means;
said sealing member being movable upwardly from said sealing position to said storage position in response to downward movement of said second end of said cable means whereby said sealing member will rotate in a second rotational direction opposite from said first rotational direction so as to cause rolling up of said curtain member around said elongated body while at the same time causing unwinding of said cable means from around said drum means;
said top sealing member being an elongated horizontally positioned cylindrical member;
at least one strap member having a first end attached to said top sealing member and having an opposite second end extending downwardly and freely from said top sealing member into said loading access opening.

2. The device of claim 1 wherein compressible pad means are attached to said building at least on the vertical opposite sides of said access opening so that when said vehicle is abuttingly against said pad means and said sealing means is in said sealing position, said pad means presents a weather tight seal for at least the vertical sides of said vehicle and said top sealing member and said curtain present a weather tight seal between the top of said vehicle and said building.

3. The device of claim 2 wherein said pad means comprises first and second vertical side pads along opposite vertical sides of said access opening and a third horizontal top pad extending across said access opening above said vertical side pads.

4. The device of claim 1 wherein said top sealing member is an elongated horizontally positioned cylindrical member.

5. The device of claim 1 further comprising an elongated hood means which attaches to said building and extends and covers across and above said adjustable top seal.

6. A device according to claim 1 wherein counterbalance means are connected to said second end of said cable means for creating force which is opposite to the force created by the weight of said sealing means on said cable means.

7. A device according to claim 6 wherein said counterbalance means comprise spring means interconnecting said second end of said cable means and said dock.

8. A device according to claim 6 wherein said counterbalance means comprises a weighted member connected to said second end of said cable means.

9. The device according to claim 1 wherein said second end of said cable means is free from counterbalance means.

10. A device according to claim 1 wherein said strap member is wound around member in the same first direction as said curtain means with said second end being free for grasping and pulling.

11. A loading dock adjustable top seal for providing a weather-tight seal between the top of a vehicle and the top of a loading access opening of a loading dock associated with a building when said vehicle is in an abutting relationship against said building, comprising:
a vertically adjustable horizontal top sealing member having an elongated body extending across the width of said loading access opening;
said elongated body comprising a rigid tubular core for support, an intermediate resilient compressible layer surrounding said core, and a first attachment means on the external surface of said intermediate layer;
a second attachment means mounted across and above said loading access opening;
curtain means having an upper and a lower edge, said upper edge being attached to said second attachment means mounted across and above said loading access opening, said lower edge being attached to said first attachment means; and
means for moving said top sealing member between a storage position above said access opening wherein said curtain means is wound around said body to a sealing position wherein said curtain means is at least partially unwound from around said body and said body rests on the top of said vehicle, said compressible layer of said body member being compressible against the top of said vehicle to facilitate sealing engagement between said body and said top of said vehicle.

12. The device of claim 11 wherein strap members having first ends which are attached to said top sealing means at spaced apart positions along the same line said curtain is attached to said top sealing member, and having opposite second ends which extend downwardly and freely from said top sealing member into said loading access opening.

13. The device of claim 12 wherein said strap members are rollable or windable upon said top sealing means being interlayered with said curtain means.

14. The device of claim 12 wherein slat means are inserted into said curtain means for approximately the length of the circumference of said top sealing member to align with the rolled position of said strap members and therefore reduce localized compressment of said top sealing member of said strap members.

15. A loading dock adjustable top seal for providing a weathertight seal between the top of a vehicle and the top of a loading access opening of a loading dock associated with a building when said vehicle is in an abutting relationship against said building, comprising:
a vertically adjustable horizontal top sealing member having an elongated body extending across the width of said loading access opening;
a curtain means having an upper and a lower edge, said upper edge being attached to an attachment means mounted across and above said loading access opening, said lower edge being attached along said elongated body;
cable drum means mounted to said elongated body;
sheave means mounted above said access opening;
cable means having a first end connected to said cable drum means, said cable means extending over said sheave means and thence downwardly and terminating in a second end;
counter balance means connected to said second end of said cable means for yieldably resisting upward movement of said second end of said cable means;
said cable means being wrapped around said drum means in a first direction and said curtain means being wrapped around said elongated body in a second direction opposite from said first direction;
grasping means attached to said top sealing member and having a free end for manual grasping to permit downward pulling of said top sealing member from a storage position above said top of said access opening to a sealing position spaced below said top of said access opening, whereby said sealing member will rotate in a first rotational direction during said downward movement so as to cause unrolling of said curtain member from said elongated body while at the same time causing said cable means to wind up around said drum means;
said sealing member being movable upwardly from said sealing position to said storage position in response to downward movement of said second end of said cable means whereby said sealing member will rotate in a second rotational direction opposite from said first rotational direction so as to cause rolling up of said curtain member around said elongated body while at the same time causing unwinding of said cable means from around said drum means.

* * * * *